United States Patent
Acosta

(10) Patent No.: US 7,618,099 B1
(45) Date of Patent: Nov. 17, 2009

(54) INTERCHANGEABLE SPOKE WHEEL COVERS

(76) Inventor: Eurie H. Acosta, 3317 E. Bell Rd., Suite 101 #127, Phoenix, AZ (US) 85032

( * ) Notice: Subject to any disclaimer, the term of this patent is extended or adjusted under 35 U.S.C. 154(b) by 0 days.

(21) Appl. No.: 12/175,575

(22) Filed: Jul. 18, 2008

(51) Int. Cl.
*B60B 7/14* (2006.01)
*B60B 7/06* (2006.01)

(52) U.S. Cl. ............... 301/37.372; 301/37.102; 301/37.41

(58) Field of Classification Search ........... 301/37.101, 301/37.102, 37.371, 37.372, 37.41, 37.29
See application file for complete search history.

(56) References Cited

U.S. PATENT DOCUMENTS

| | | | |
|---|---|---|---|
| 3,549,204 A * | 12/1970 | Spisak | 301/37.371 |
| 3,930,526 A | 1/1976 | Edwards | |
| 3,934,936 A | 1/1976 | Fine | |
| 4,286,824 A | 9/1981 | Brown | |
| 5,636,906 A | 6/1997 | Chase | |
| 5,803,552 A * | 9/1998 | Kato et al. | 301/37.41 |
| 5,820,225 A * | 10/1998 | Ferriss et al. | 301/37.371 |
| 5,921,304 A | 7/1999 | Nipper | |
| 6,527,346 B2 | 3/2003 | Chen | |
| 6,692,085 B1 | 2/2004 | Threadgill | |
| 7,344,198 B1 | 3/2008 | Dohm | |
| 7,452,037 B1 * | 11/2008 | Nunes | 301/37.31 |
| 2009/0127920 A1 * | 5/2009 | Takeda et al. | 301/37.41 |

OTHER PUBLICATIONS

US 6,755,485, 06/2004, Chase (withdrawn)

* cited by examiner

*Primary Examiner*—Jason R Bellinger
(74) *Attorney, Agent, or Firm*—Lawrence J. Gibney, Jr.

(57) ABSTRACT

The interchangeable spoke wheel cover in this case will be used to add some decorative flare to the wheel of an automobile by allowing an individual to easily add a decorative wheel insert. The device will not require modification of the existing wheel and will be placed over the existing wheel. Additionally, the wheel can be easily removed and changed depending on the particular tastes and desires of the consumer.

7 Claims, 4 Drawing Sheets

INTERCHANGEABLE SPOKE WHEEL COVERS

BACKGROUND OF THE INVENTION

A. Field of the Invention

This relates to adding a decorative covering to a wheel rim. It may be applied to a variety of wheels, including reinforced spoke rims. It can even be removed and a number of designs can be used.

B. Prior Art

There are many references in the prior art that teach wheel cover devices and rims including what is frequently termed as spinners. Representative examples can be found at Chen, U.S. Pat. No. 6,527,346, Brown, U.S. Pat. No. 4,286,824 and Threadgill, U.S. Pat. No. 6,692,085.

Chen is a removable wheel cover ring and not a removable, interchangeable wheel cover. Brown is a wheel with replacement spokes and Threadgill is a wheel cover shield. These are representative examples of the prior art and are not exhaustive but none of these devices or the other references in this area are interchangeable wheel covers.

This is a device that can add a certain amount of panache or style to a wheel and can be changed depending on the tastes of the consumer.

BRIEF SUMMARY OF THE INVENTION

This is a device to add a decorative touch to an existing automobile wheel. Wheels have been in existence for as long as automobile tires have been around. Wheels come in a variety of different shapes and designs, but they are essentially circular and support the structure of a tire.

The owner of an automobile may desire a certain decorative touch to a wheel. This type of device can come in a variety of different shapes and sizes and a representative example of a device to add a decorative touch is the spinner or spinner assembly. This device is not a spinner because this device is designed to rotate with the rotation of the tire itself and not independent of the wheel.

This application describes an insert which would be attached to the interior of an existing wheel probably using the existing lug nuts. Alternatively the insert may have threaded members to attach to the wheel.

Wheels are circular and a tire is placed on the outside of the wheel. In the center of the wheel is a centerpiece that provides several openings for the lug nuts, which mount the wheel on a vehicle. A plurality of spokes is connected to the interior of the wheel on one end and to the interior mounting device on the other.

When the insert is added to the wheel, the spoke of the wheel should be completely hidden by the spoke of this device. Because wheels come in all sizes with a variety of spokes, the inserts will also come in different sizes to cover the spokes of a wheel.

The wheel would be provided with an oversized opening into which at least one bushing that is on the insert is placed. The oversized opening and bushing insures that the insert rotates with the tire and prevents wobble of the insert as the tire rotates. A single bushing or multiple bushings may be used to insure that the insert remains in place at all times and does not create excessive wobble as the tire rotates. The bushing or bushings should tightly fit within the oversized opening so that the insert will rotate with the tire.

A variety of designs for the inserts may be used and standard lug nuts will be used to add this device to the wheel.

DETAILED DESCRIPTION OF THE EMBODIMENTS

Figure 1:
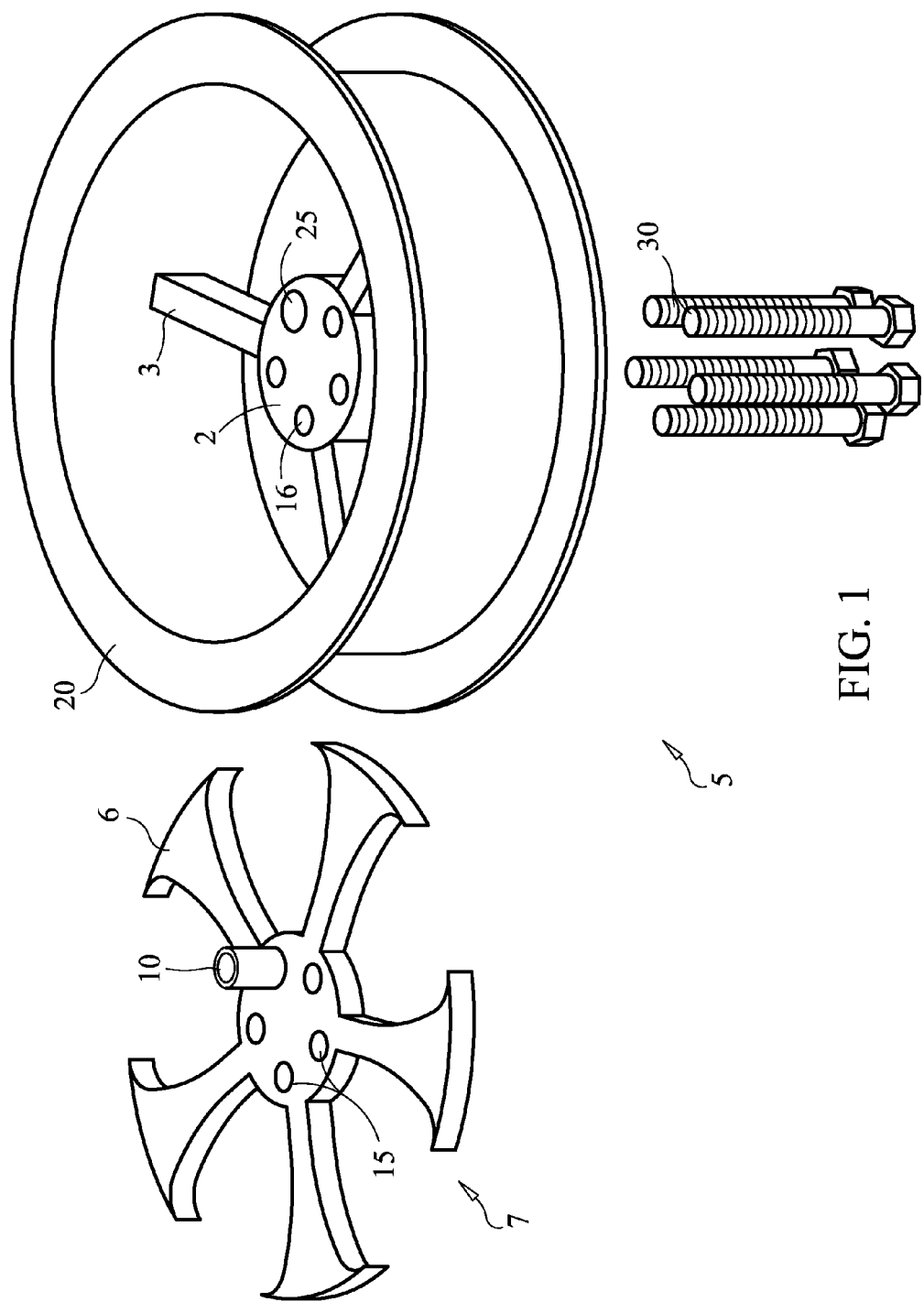
FIG. 1 is an isometric view of the components of this device from the back.

This device 5 is comprised of two separate parts: the wheel 20 and a decorative insert 7. The wheel 20 is circular and will secure a tire; the wheel 20 and tire are mounted on a vehicle.

Within the interior of the wheel 20 a spoke structure provides support for the wheel and provides a means to mount the tire to the vehicle. Part of the spoke structure is comprised of an interior circular member 2 which is secured to the interior of the wheel with a series of spoke members 3 that extend from the interior circular member 2 to the interior of the wheel. In the interior circular member 2 are a series of openings 16 through which a means to mount the wheel to the vehicle is provided. One of the openings on the interior circular member is oversized 25 to accommodate a bushing 10 on the insert 7. Threaded mounting bolts 30 may be used or lug nuts (not depicted) are very common means to mount a wheel to a vehicle. The use of lug nuts is probably the most common means to mount a wheel to the car.

When lug nuts are used the threaded bolts that are part of the wheel assembly would extend through the openings of the wheel and this insert and be secured with the lug nut.

Figure 2:
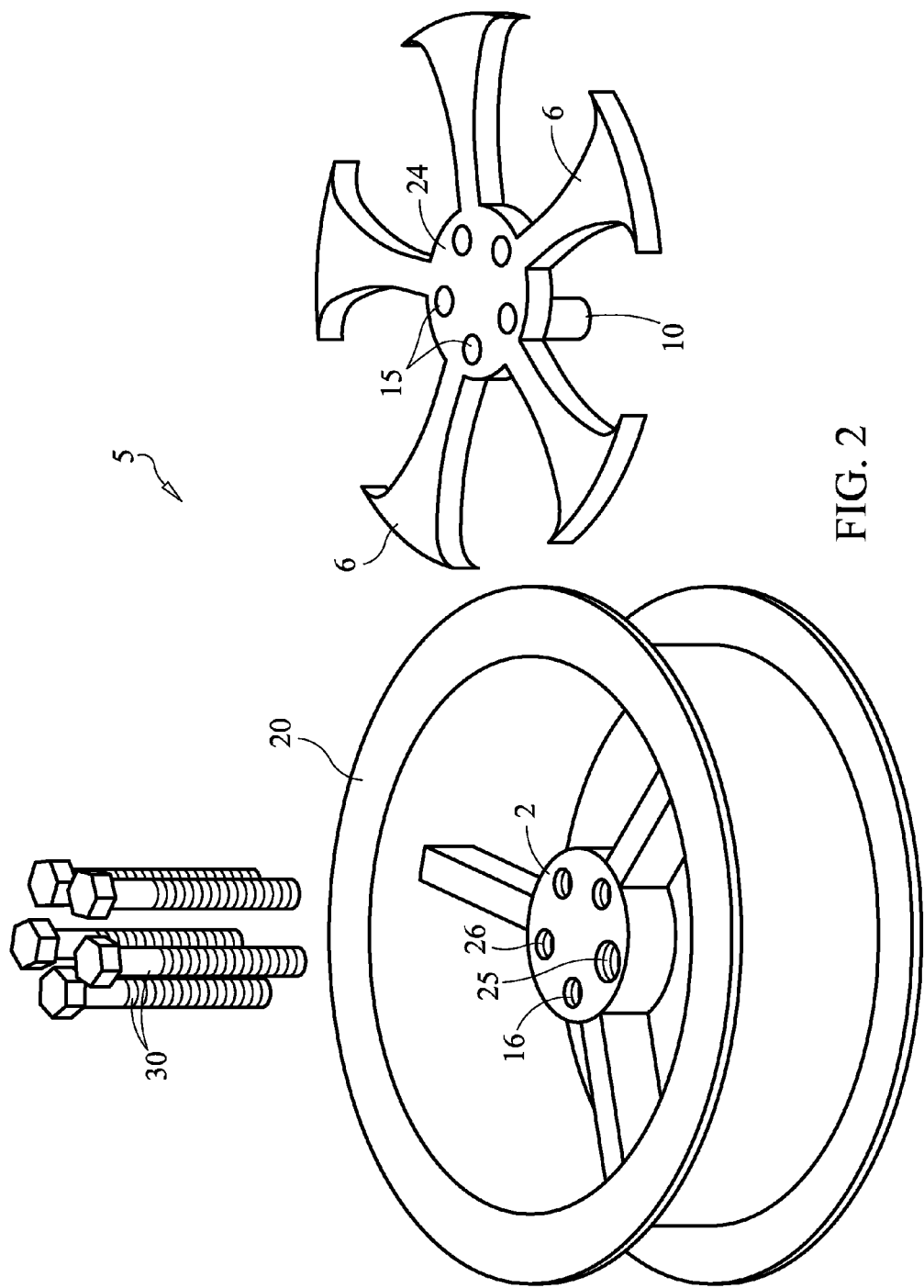
FIG. 2 is an isometric view of the components of this device from the front.
Figure 3:
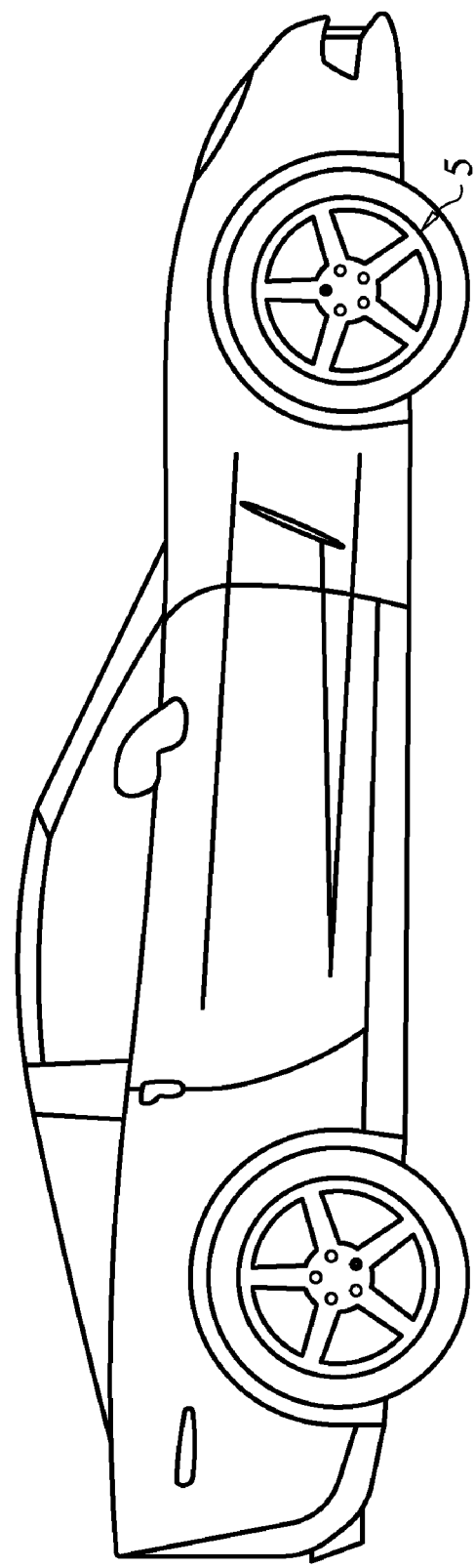
FIG. 3 is view of the device in use.

The threaded mounting bolts are inserted into an unthreaded interior circular member or threaded interior circular member such as depicted in FIGS. 1 and 2 respectively. When the interior circular member is not threaded, the mounting bolt will be secured to the wheel assembly (not depicted).

When the interior circular member is threaded, the threaded bolt are passed through the openings in the insert and secured to the threaded portion of the interior circular member.

Figure 5:
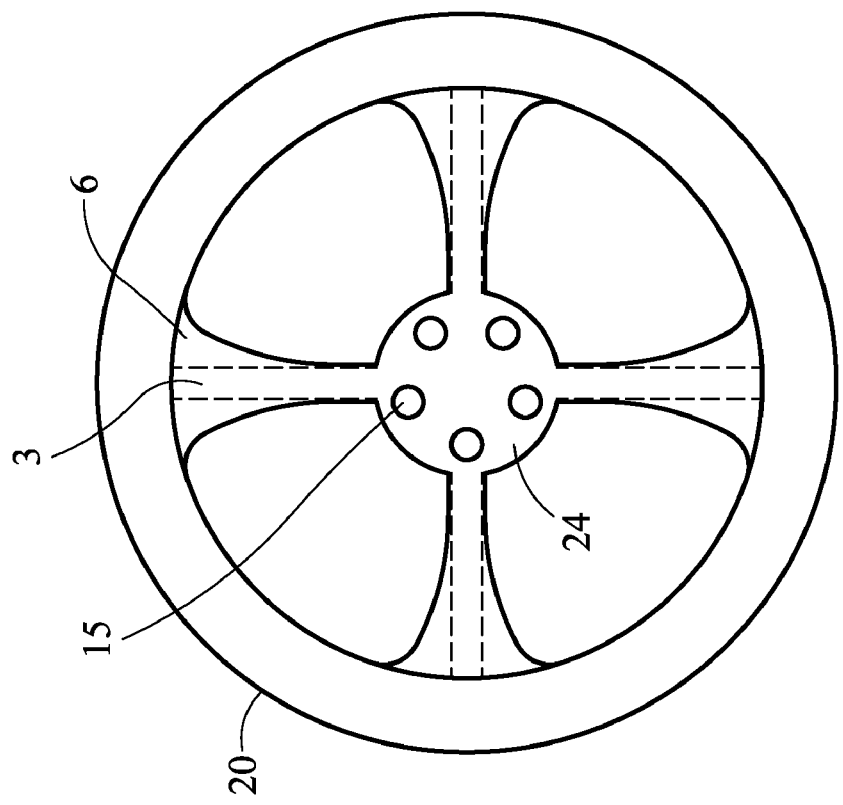
FIG. 5 is a front view of the device inserted into the opening for a four spoke wheel.
Figure 4:
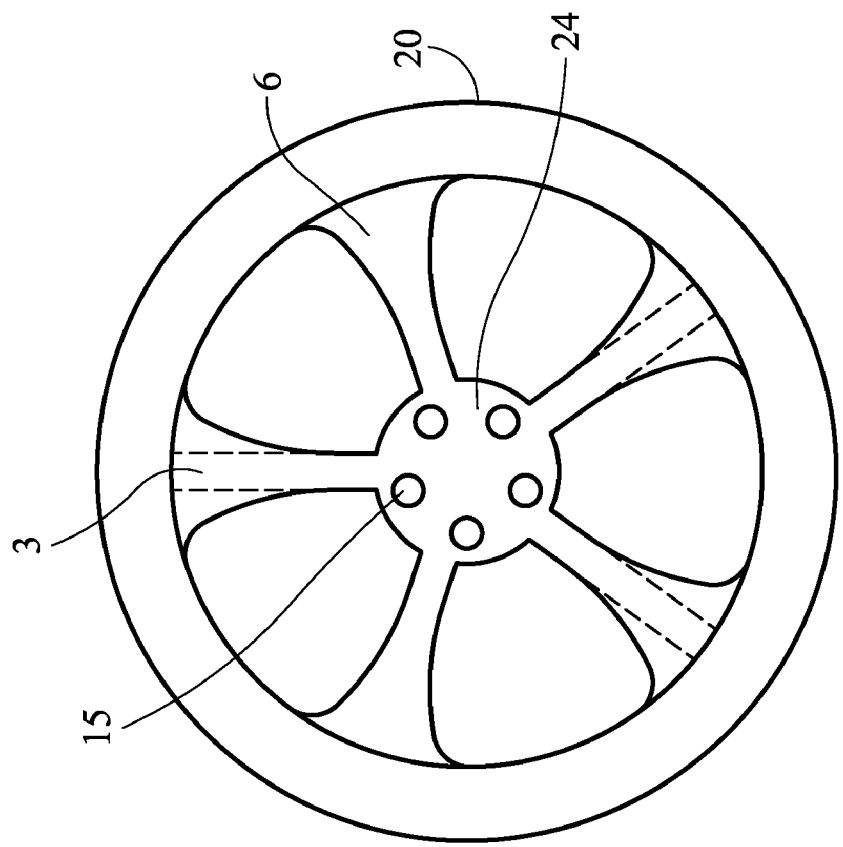
FIG. 4 is a front view of the device inserted into the opening for a three spoke wheel.

Wheels are made with one or more multiple spokes 3 that emanate from the center circular member 2. The spokes provide structure so that the wheel can support the weight of the car. Some wheels have three spokes such as depicted in FIG. 4 and some wheels have four spokes such as depicted in FIG. 5. The number of spokes is a manufacturing choice.

The other component of this device is the decorative insert 7. The insert 7 is sized so that it fits within the interior of the wheel 20 and obscures the view of the spokes of the wheel such as depicted in FIGS. 4 and 5. The decorative insert 7 will have a circular member 21 with openings 15 through which the means to mount the wheel will pass such as mounting bolts 30 such as depicted in FIGS. 1 and 2 or lug nuts that are commonly found in the prior art but not depicted.

A bushing 10 will be provided on the insert 7 and fit snugly within an oversized opening 25 in the circular member 2 of the wheel 20. The bushing 25 of the insert should fit snugly in the oversized opening because the wheel and tire will rotate at very high speeds and the insert should rotate with the wheel and not wobble.

The decorative insert 7 will have a series of spokes 6 that emanate from the center of the circular member 24 and the variety of the spokes will be as varied as the tastes of the consumer. When the device is installed, the spokes 6 of the decorative insert will cover the spokes 3 of the wheel insert so that when tire is rotating the spokes or design of the decorative insert and not the spokes of the wheel will be visible.

Certain manufacturers use five openings 15 and other use six openings to mount the wheel to the car. The number of openings will also determine the number of spokes for the wheel. Accordingly the appropriate insert with the requisite number of spokes should be used to cover the number of spokes on the wheel.

Mounting bolts 30 which are threaded at one end may be used and inserted through the opening of the wheel insert 15 and may be secured by internal threads 26 of the wheel. The bolts and lug nuts (not depicted) that are part of the car may also be used to mount the wheel 20 and the insert 7. Threaded mounting bolts may also pass through unthreaded openings and be secured to the wheel assembly (not depicted).

Alternatively, the lugs nuts that are part of the automobile may pass through the openings of the wheel and the insert and be secured by a lug nut (not depicted). The use of lug nuts is very common in the prior art.

The insert can easily be added to an existing wheel structure and likewise can be easily removed. The insert will be as varied according to the tastes of the individual consumer.

A multitude of different designs are contemplated by this application. It is impossible to describe all possible combinations.

The inventor claims:

1. An interchangeable spoke wheel cover, which is comprised of:
   a. a rim;
   wherein the rim is circular;
   wherein a tire is mounted to the rim;
   wherein an interior circular member is provided within the interior of the rim;
   wherein rim spokes are connected to said interior circular member at one end and to the interior of the tire rim to the other;
   wherein openings are provided in the interior circular member;
   wherein an opening is provided in the interior circular member;
   b. decorative insert;
   wherein the insert will fit within the interior of the rim;
   wherein a circular member is provided;
   wherein spokes emanate from the circular member;
   wherein the spokes of the insert will obscure the view of the spokes of the rim;
   wherein a plurality of openings is provided;
   wherein a bushing is placed on one of the openings;
   said bushing fits within the opening in the interior circular member;
   c. means to mount;
   wherein a means to mount the insert to the rim is provided;
   wherein the means to mount will pass through the openings in the rim;
   wherein the means to mount will pass through the openings in the insert.

2. The interchangeable spoke wheel cover device as described in claim 1 wherein the means to mount is plurality of mounting bolts.

3. The interchangeable spoke wheel cover device as described in claim 1 wherein the means to mount is a plurality of lug nuts.

4. The interchangeable spoke wheel cover as described in claim 1 wherein the openings in the interior circular member are threaded.

5. The interchangeable spoke wheel cover as described in claim 1 wherein the openings in the interior circular member are not threaded.

6. The interchangeable spoke wheel cover as described in claim 1 wherein the number of openings is five.

7. The interchangeable spoke wheel cover as described in claim 1 wherein the number of openings is six.

\* \* \* \* \*